(12) United States Patent
Hamlen

(10) Patent No.: US 9,202,044 B2
(45) Date of Patent: Dec. 1, 2015

(54) SYSTEM AND METHOD FOR RETROFITTING APPLICATION CODE

(71) Applicant: THE BOARD OF REGENTS, THE UNIVERSITY OF TEXAS SYSTEM, Austin, TX (US)

(72) Inventor: Kevin William Hamlen, Allen, TX (US)

(73) Assignee: The Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 14/086,179

(22) Filed: Nov. 21, 2013

(65) Prior Publication Data
US 2015/0143452 A1    May 21, 2015

(51) Int. Cl.
*H04L 25/49* (2006.01)
*G06F 21/51* (2013.01)
*G06F 21/57* (2013.01)
*G06F 21/54* (2013.01)

(52) U.S. Cl.
CPC .............. *G06F 21/51* (2013.01); *G06F 21/54* (2013.01); *G06F 21/57* (2013.01)

(58) Field of Classification Search
CPC .................................................. H04L 25/4906
See application file for complete search history.

(56) References Cited

U.S. PATENT DOCUMENTS

| | | | |
|---|---|---|---|
| 5,951,698 A | 9/1999 | Chen et al. | |
| 6,405,316 B1 | 6/2002 | Krishnan et al. | |
| 7,945,958 B2 | 5/2011 | Amarasinghe et al. | |
| 8,079,032 B2 | 12/2011 | Nichols | |
| 8,381,296 B2 | 2/2013 | Sprowls | |
| 2004/0133777 A1* | 7/2004 | Kiriansky et al. | 713/166 |
| 2009/0077383 A1 | 3/2009 | De Monseignat et al. | |
| 2012/0159630 A1* | 6/2012 | Wang | 726/24 |
| 2012/0260106 A1 | 10/2012 | Zaks et al. | |
| 2013/0139264 A1 | 5/2013 | Brinkley et al. | |
| 2014/0237594 A1* | 8/2014 | Thakadu et al. | 726/23 |

OTHER PUBLICATIONS

Miller, Barton P. et al.; A Framework for Binary Code Analysis, and Static and Dynamic Patching; Binary Code Analysis and Editing; Feb. 2006; 24 pages; U.S.

Walenstein, Andrew et al.; Normalizing Metamorphic Malware Using Term Rewritting; Dec. 31, 2006; 10 pages; U.S.

Hamlen, Kevin W. et al.; Reining in Windows API Abuses with In-Lined Reference Monitors; Jun. 3, 2010; 10 pages; U.S.

Wartell, Richard et al.; Binary Stirring: Self-randomizing Instruction Addresses of Legacy x86 Binary Code; Oct. 16, 2012; 12 pages; North Carolina U.S.

(Continued)

*Primary Examiner* — Josnel Jeudy
(74) *Attorney, Agent, or Firm* — Greenberg Traurig, LLP; Ross Spencer Garsson

(57) ABSTRACT

Disclosed is a system and method for retrofitting defensive technology that transforms potentially dangerous computer programs into safe programs. The present disclosure involves applying software rewriting and/or randomization algorithms to monitored application launches and/or API calls. The present disclosure provides systems and methods for understanding and manipulating how untrusted software will behave upon execution, thereby thwarting any chance the untrusted software could launch and/or institute a weaponized malicious software attack. The present disclosure can apply a light-weight binary rewriting and in-lining system to tame and secure untrusted binary programs. The disclosed systems and methods can also implement binary stirring by imbuing native code of software with the ability to self-randomize its instruction addresses each time it is launched.

20 Claims, 7 Drawing Sheets

(56) References Cited

OTHER PUBLICATIONS

Wartell, Richard et al.; Securing Untrusted Code via Compiler-Agnostic Binary Rewriting; Dec. 7, 2012; 10 pages; Orlando, Florida U.S.

Smithson, Matthew et al.; Static Binary Rewriting without Supplemental Information; Oct. 2013; 10 pages; U.S.

Mohan, Vishwath et al.; Frankenstein: Stitching Malware from Benign Binaries; 8 pages; U.S.

\* cited by examiner

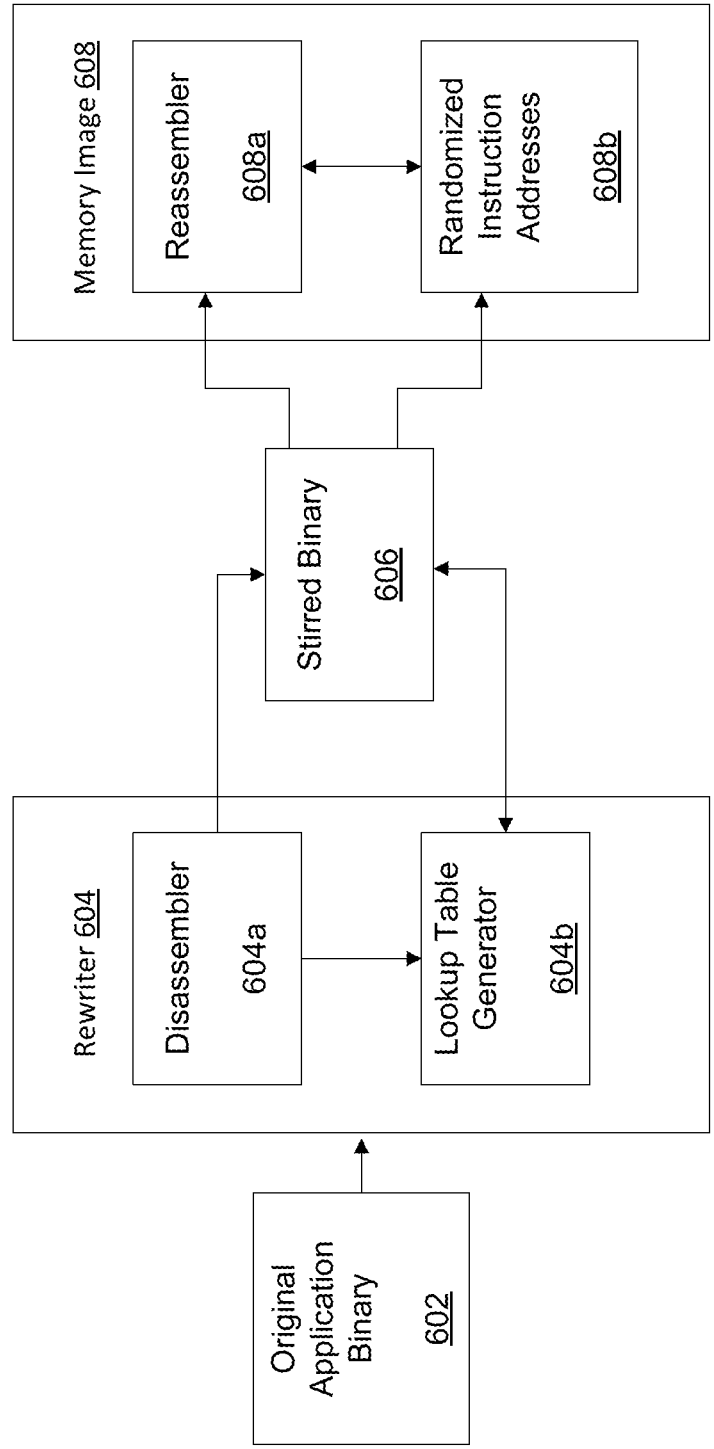

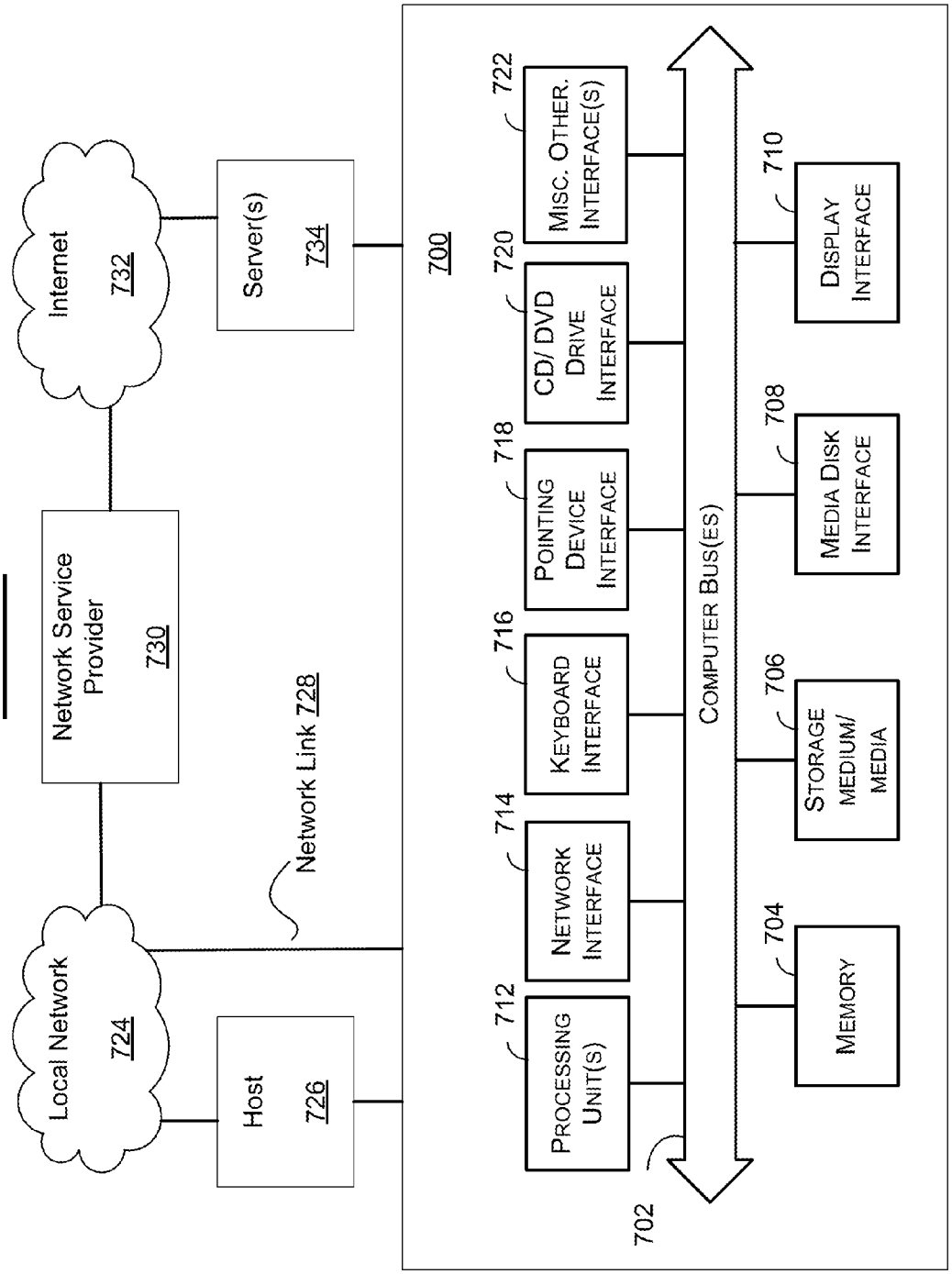

ial defenses.
SYSTEM AND METHOD FOR RETROFITTING APPLICATION CODE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure is generally related to defending a computer system from malicious software, and more particularly towards systems and methods for rewriting and randomizing application code upon identifying and executing application calls.

RELATED ART

In recent years, there has been a fundamental paradigm shift in the objectives, power and capabilities of malicious software (also referred to as "malware"). While malware technologies have historically undergone steady increases in sophistication, such malicious software iterations have historically been punctuated by periodic revolutionary leaps leading towards heightened attention from the security community. Currently, the emergence of advanced cyber-warfare weaponry and tactics is shaping a new breed of weaponized software attacks and defenses. Such software, referred to as adaptive malware, can intelligently learn and adapt to antiviral defenses.

SUMMARY

The present disclosure provides a system and method utilizing a retrofitting algorithm that remedies failings in the art respective to malware and adaptive malware detection and defenses by enabling code mutation technology for defensive purposes, thereby transforming potentially dangerous programs into safe programs. According to some embodiments, the disclosed systems and methods involve applying software rewriting and/or randomization algorithms to monitored API calls. According to some embodiments, such application of rewriting and/or randomization algorithms occurs at the binary level. The present disclosure provides systems and methods for understanding and manipulating how untrusted software will behave upon execution, thereby thwarting any chance the untrusted software could launch and/or institute a malicious software attack. According to some embodiments, the untrusted software may be weaponized malicious software, whereas in some embodiments, the software may include commercial software that has been hijacked by malware; it should be understood that the applications of the disclosed systems and methods are applicable to any type of malicious software, whether known or to be known.

According to some embodiments, upon identification and/or execution of untrusted software, the disclosed systems and methods can implement REINS, a light-weight binary rewriting and in-lining system to tame and secure untrusted binary programs. According to some embodiments, the present disclosure can additionally (or alternatively in some embodiments) implement STIR, which effectuates binary stirring by imbuing native code of software with the ability to self-randomize its instruction addresses each time it is launched. The effects of a combinational application of REINS and STIR, according to some embodiments, effectuates a retrofitting algorithm that implements a defense to stealth malicious technologies, whether known or to be known. That is, the present disclosure effectuates computer defense systems and methods that account for metamorphic malware that other systems typically would identify as benign software.

In accordance with one or more embodiments, a method is disclosed that includes receiving, at a computing device, a request to launch a program; identifying, via the computing device, the binary code associated with the requested program; rewriting, via the computing device, the binary code, said rewriting comprising disassembling the binary code to identify a set of known targets within the code, said rewriting further comprising applying a policy to the binary code to restrict actions of the code upon execution of the program; verifying, via the computing device, the rewritten binary code, said verification comprises certifying said rewritten binary is compliant with said policy; launching, via the computing device, said program based upon said rewritten binary, said launching comprising execution of said program at a load-time; and rearranging, via the computing device, the binary code of the program, said rearranging occurring at said load-time, said rearranging comprising stirring the binary code by randomly organizing an internal layout of the binary code in response to said launching.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for defending a computer system by applying a retrofitting algorithm that rewrites and randomizes application code upon identifying and executing application calls.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 6 is a schematic block diagram illustrating steps and components of a system in accordance with embodiments of the present disclosure; and FIG. 7 is a block diagram illustrating architecture of a hardware device in accordance with one or more embodiments of the present disclosure.

DESCRIPTION OF EMBODIMENTS

Figure 1:
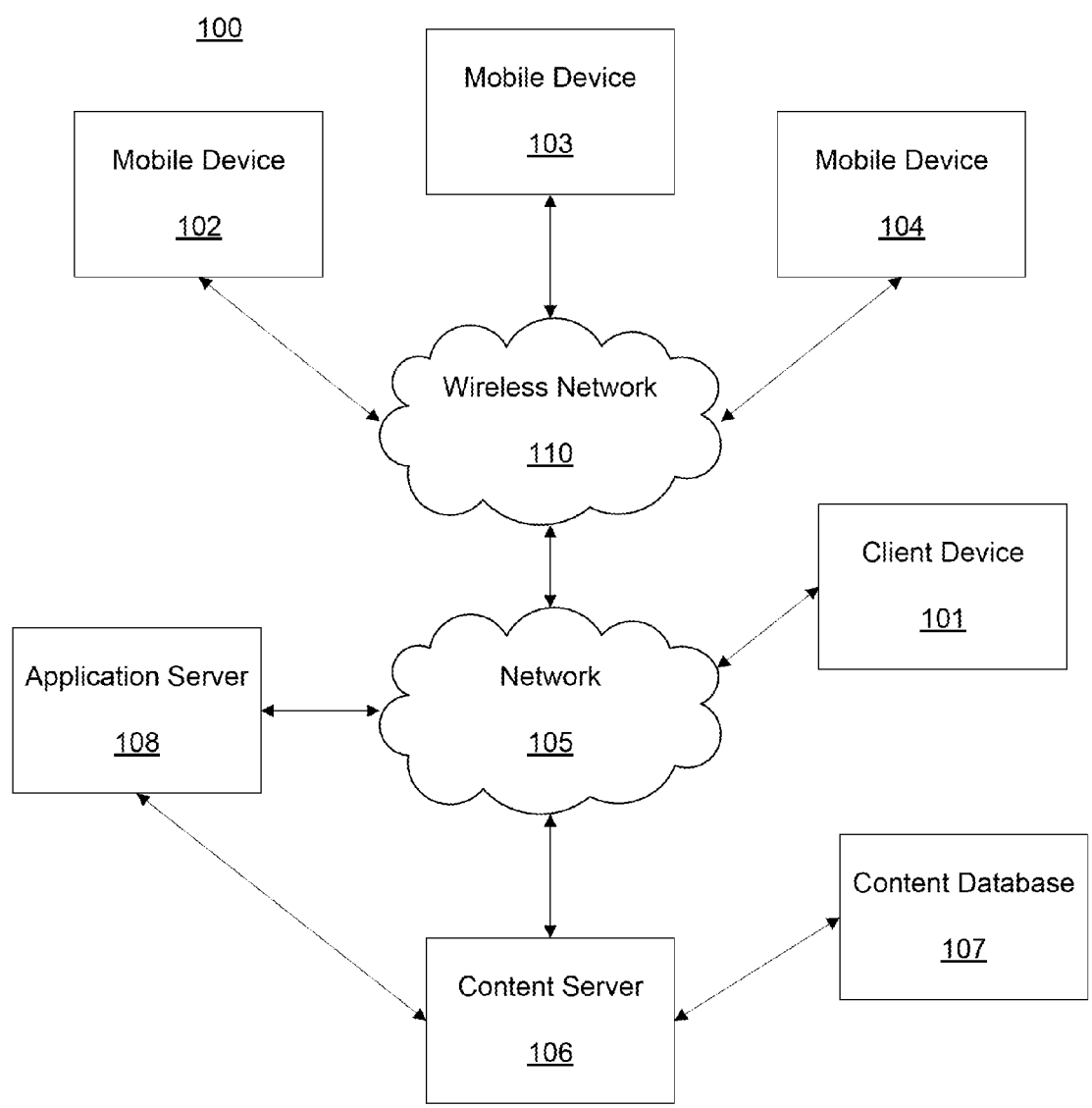
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, malicious software (e.g., Malware) generally refers to software used to disrupt a computer or computer system's operation. This includes, inter alia, gathering sensitive information or gaining access to private networks or systems. Malware can be in the form of active content, scripts, code and/or other types of software structures. Malware can be in a variety of forms for the implementation of hostile or intrusive software on computer systems and networks. Such software includes computer viruses, worms, ransomware, Trojan horses, rootkits, spyware, malicious browser helper objects (BHOs), rogue security software, and the like. As understood in the art, Malware is a computer contaminant which may be in the form of, or disguised as genuine software, whereby only upon installation or execution, the harmful embedded software effectuates an attack and/or spread of the malicious software.

Over the last decade, malware technology evolved to employ zero-day exploits and botnets. For example, in 2003, the Slammer worm infected an estimated 90% of infectable hosts within minutes of its release. Although the primary vulnerability it exploited was not a zero-day, the unprecedented speed with which it exploited a widely unpatched vulnerability placarded the inadequacies of semi-manual responses to intrusions. Fully automated methods of reliably detecting and quarantining previously unseen malware, and patching newly discovered vulnerabilities in a computer system became a defensive imperative. Indeed, in 2007, numerous botnets introduced a new wrinkle for defense: adversarial command and control (C&C). That is, through a C&C network, bot-masters were enabled the ability to respond to defender gambits by uploading malware software updates.

Most recently, a current advancement in next-generation attacks involves reactively adaptive malware. Conventional malware capitalizes on the observation that nearly all conventional malware obfuscation strategies have a common weakness involving mutations that are undirected (e.g., identifying invariant feature patterns to craft signatures that match all variants of the malware). Reactively adaptive malware, in contrast, undergoes directed mutations. The reactive malware, as understood by those of skill in the art, can intelligently learn a model of how signature matchers identify malware, and then reverse such identified signature to discover obfuscations that defeat them. Currently, this enables such reactive malware to quickly adapt and evade signature updates. Reactively adaptive malware thus instantiates true stealth rather than mere undirected diversity. That is, rather than mutating purely randomly, reactively adaptive malware re-implements itself entirely from code fragments that it harvest from programs (e.g., benign programs) already present on infective victims' computer systems.

Such malware is not limited to a finite set of code transformation rules; such reactively adaptive malware can learn from new implementations of itself from an expanding corpus of programs the malware encounters on a computer network. Moreover, since each mutation of the malware is composed entirely of code from "normal" programs (e.g., benign programs), the malware (and/or fragments of the malware program) tends to exhibit statistical features typical of benign software.

For example, for illustrative purposes of detailing the current state of malware, and not limiting respective the systems and methods of defense disclosed herein, the "Frankenstein" virus is an embodiment of known reactively adaptive malware; however, it should be understood that the disclosed systems and methods are applicable to other types of adaptive malware and viruses, whether known or to be known. For example, the "Frankenstein" virus is implemented by taking snippets of benign computer code from ordinary programs (e.g., computer browser and the like) and splicing them together to create malware. In other words, the virus/malware can build itself out of discarded pieces of benign computer code. Such virus is programmed to perform certain tasks, and while this normally would be common place for conventional anti-virus software to detect, the virus takes different forms each time it infects a new computer system due to the borrowing code from ordinary computer programs; therefore, such reactively adaptive malware is increasingly difficult to detect and/or defend against.

Thus, the current landscape of computer defense has been transformed from a previously "isolate and destroy" scenario into a "chess match" in which each side seeks to systematically capture and destroy the other's assets. As such, it is no longer possible within the current defense environment to simply win cyber-battles with a strong defense, as offensive capabilities are needed, as discussed herein.

The present disclosure, as discussed in more detail below, provides adaptive malware detection and defenses by enabling code mutation technology learned from reactively adaptive malware for defensive purposes, thereby transforming potentially dangerous programs into safe programs. According to some embodiments, the disclosed systems and methods involve binary transformation of untrusted code. Rather than simply inspecting untrusted programs for malicious programming, or executing them "as-is" in a heavily monitored environment, the disclosed systems and methods preemptively modifies untrusted programs before they execute to make then incapable of violating system and/or user specified safety policies. The code transformations implemented through the disclosed systems and methods are designed so that non-malicious code suffers no negative effects, as such code's "safe" behaviors are preserved; however, malicious (e.g., concealed) programming is rendered inoperable. An advantage provided by the present disclosure is that the transformation algorithms discussed herein need not actually detect all malicious code in order to successively deactivate it.

As discussed in more detail below, the disclosed systems and methods involve applying software rewriting and/or randomization algorithms as a retrofitting algorithm. That is, in some embodiments, upon identification and/or execution of untrusted software, the disclosed systems and methods can implement a Rewriting and In-lining System (REINS). As discussed in more detail below, REINS automatically transforms an application's native code by instrumenting them with security checks that enforce a specified safety policy. Such safety policy can be set by the user, system, REINS developer, network administrator, and the like, and/or any combination thereof. In some embodiments, REINS takes only the raw application binary and policy as input, as application source code and/or debugging information may not be required. That is, REINS' transformations are agnostic to the source language, compiler, and tool chain used to generate the original application program. Thus REINS can transform applications such that any policy-violating functionality that may have been lurking within the application is rendered unreachable or inert. REINS performs such transformations, as discussed in more detail below, before the requested program executes (or runs). Thus, the transformed program contains new programming (or transformed programming) that monitors and censors its own API calls as it runs, thereby rendering inert any policy violating functionality.

Additionally, according to some embodiments, the present disclosure can also implement a Self-Transforming Instruction Relocation (STIR) system within the retrofitting algorithm. In general, STIR effectuates binary stirring by imbuing native code of software with the ability to self-randomize its instruction addresses each time it is launched. That is, as discussed in more detail below, the STIR system protects binary native code applications from return-orientated programming (ROP) attacks by imbuing them with the power to randomize their own basic block layouts each time they are loaded. By frequently re-randomizing all such locations, ROP attacks are stymied by the transformation without the need for a precise and/or comprehensive policy that identifies all exploitable software vulnerabilities.

Thus, as discussed in more detail below, the effects of a combinational application of REINS and STIR, according to some embodiments, effectuates a defense to stealth malicious technologies, whether known or to be known. That is, the present disclosure's systems and methods provide automated, preemptive and binary transformations that modify potentially dangerous byte sequences in untrusted programs before they run, thereby precluding malicious software behavior.

Indeed, as discussed in more detail below, neither STIR nor REINS performs virus protection. That is, neither system attempts to detect viruses. Instead, the disclosed systems and methods, through applications of REINS and/or STIR, perform malicious behavior detection. According to embodiments discussed below, the present disclosure retrofits all incoming, untrusted code (e.g., viruses and non-viruses alike) to enforce security policies. These retrofitted programs, whether malicious, hijacked or benign, are prevented from performing (or exhibiting) policy violating actions. Thus, within the scope of the present disclosure, viruses may in fact execute, but they are unable to perform malicious action. For example, they may simply crash, as outlined below, with reference to the discussion respective FIGS. 4-6. Therefore, even if a virus/malware is not detected by third party anti-virus software, the virus/malware is stopped from being effective through the systems and methods discussed herein.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, but limited to, content server 106 and application (or "App") server 108.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content server 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or in conjunction with a social networking site. A social network refers generally to an electronic or digital, person to person, or combination thereof, network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may be cloud based and/or may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as an email platform, social networking site music site/platform, a movie site or platform or any other type of content hosted, retrievable, downloadable or accessible via a web page or service, or a personal user site (such as a blog, vlog, online dating site, and the like). Indeed, a content server 106 may also host a variety of sites providing any range of content, including, but not limited to, music sites, movie sites, streaming content, business sites, educational sites, dictionary sites, encyclopedia sites, wikis, financial sites, government sites, and the like. In some embodiments, the content server 106 may also provide advertising or marketing content. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, email services, instant messaging (IM) services, SMS services, MMS services, FTP services, voice over IP (VOIP) services, or the like. Such services, for example the email services and email platform, can be provided via the content server 106. Examples of content may include images, text, audio, video, or the like, which may be processed in the form of physical signals, such as electrical signals, for example, or may be stored in memory, as physical states, for example.

Servers 106 and 108 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by servers 106 and/or 108. This may include in a non-limiting example, email servers, social networking services servers, SMS servers, IM servers, MMS servers, exchange servers, photo-sharing services servers, and travel services servers, via the network 105 using their various devices 101-104. In some embodiments, applications, such as a photo-sharing or viewing application (e.g., Flickr®, Instagram®, and the like), can be hosted by the application server 108. Thus, the application server 108 can store various types of applications and application related information including application data and user profile information. In another example, a content server 106 acting as an email server can host email applications; therefore, the content server 106 can store various types of applications and application related information including email application data and user profile information, which can be correlated with the application server 108. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106 and 108 as single computing devices, respectively, the disclosure is not so limited. For example, one or more functions of servers 106 and 108 may be distributed across one or more distinct computing devices. Moreover, in one embodiment, servers 106 and/or 108 may be integrated into a single computing device, without departing from the scope of the present disclosure.

Figure 2:
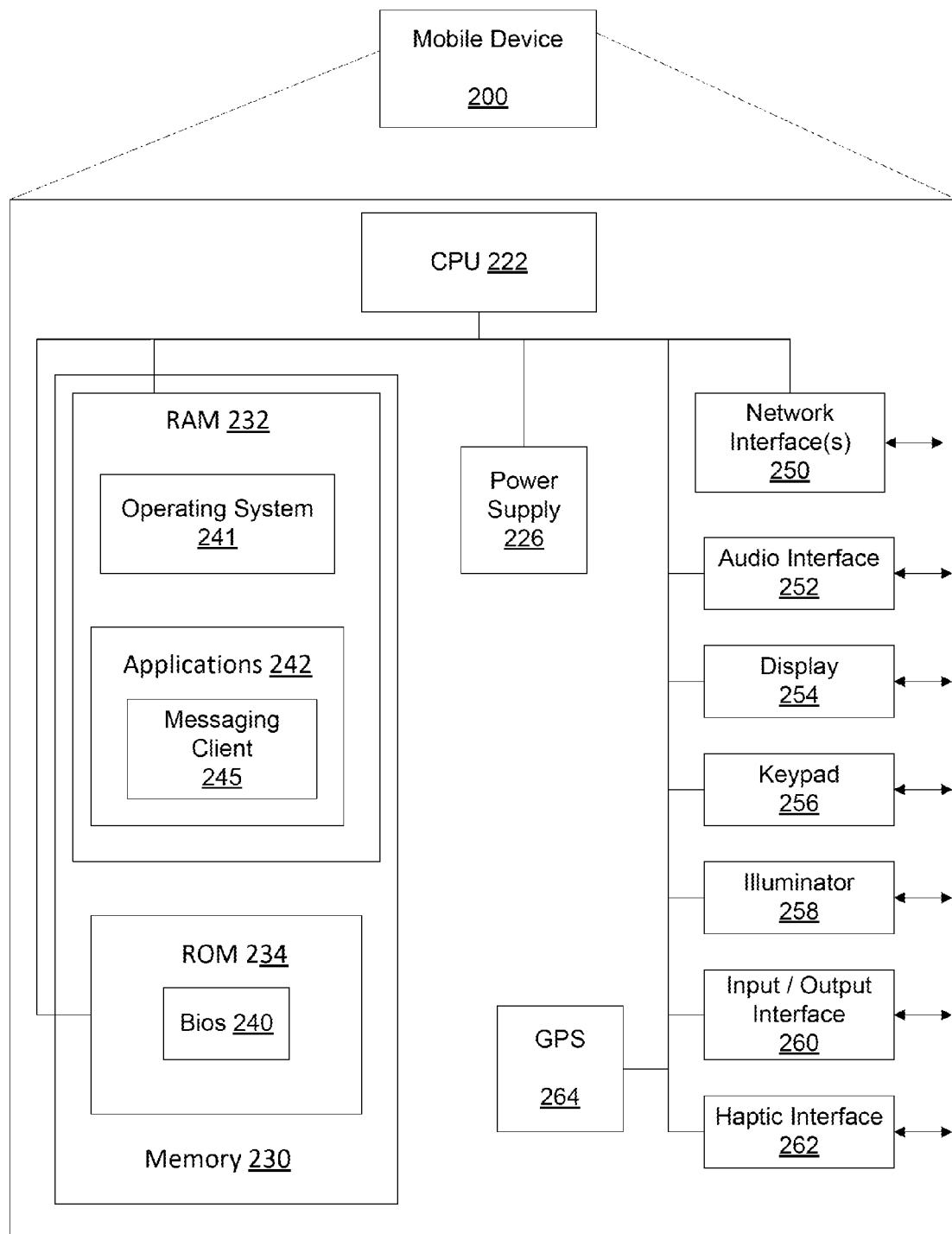
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes at least one processing unit (CPU) 222 in communication with a mass memory 230 via a bus. Client device 200 also includes a power supply 226, one or more network interfaces 250, an optional audio interface 252, an optional display 254, an optional keypad 256, an optional illuminator 258, an optional input/output interface 260, an optional haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. Mass memory 230 also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200. It should be understood that the client device 200 may also be coupled to, or associated with an external mass storage.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using SMS, MMS, IM, email, VOIP, and/or any of a variety of other messaging communication protocols. Although a single messaging client 245 is illustrated it should be clear that multiple messaging clients may be employed. For example, one messaging client may be configured to manage SMS messages, where another messaging client manages IM messages, and yet another messaging client is configured to manage serving advertisements, emails, or the like.

Having described the components of the general architecture employed within the disclosed systems and methods, the components' general operation with respect to the disclosed systems and methods will now be described.

Figure 3:
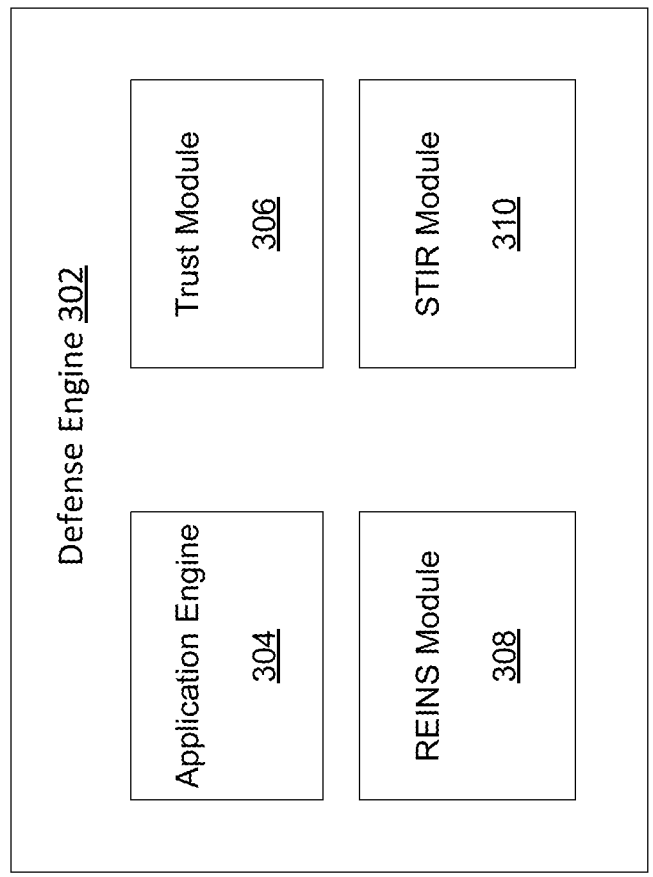
FIG. 3 is a schematic block diagram illustrating components of a system in accordance with embodiments of the present disclosure.

FIG. 3 is a block diagram illustrating the components for performing the systems and methods discussed herein. FIG. 3 includes a defense engine 302. The defense engine 302 could be hosted by a user's computing device, web server, content provider, application service provider, an advertisement server, and the like, or any combination thereof. The defense engine 302 includes an Application module 304, Trust module 306, REINS module 308 and a STIR module 310. It should be understood that the engine(s) and modules discussed herein are non-exhaustive, as additional or fewer engines and/or modules may be applicable to the embodiments of the systems and methods discussed. The operations, configurations and functionalities of the defense engine 302 and each module 304-310, and their role within embodiments of the present disclosure will be discussed with reference to FIGS. 4-6, whereby the components of engine 302 are implemented to perform the steps and processes discussed below.

Figure 4:
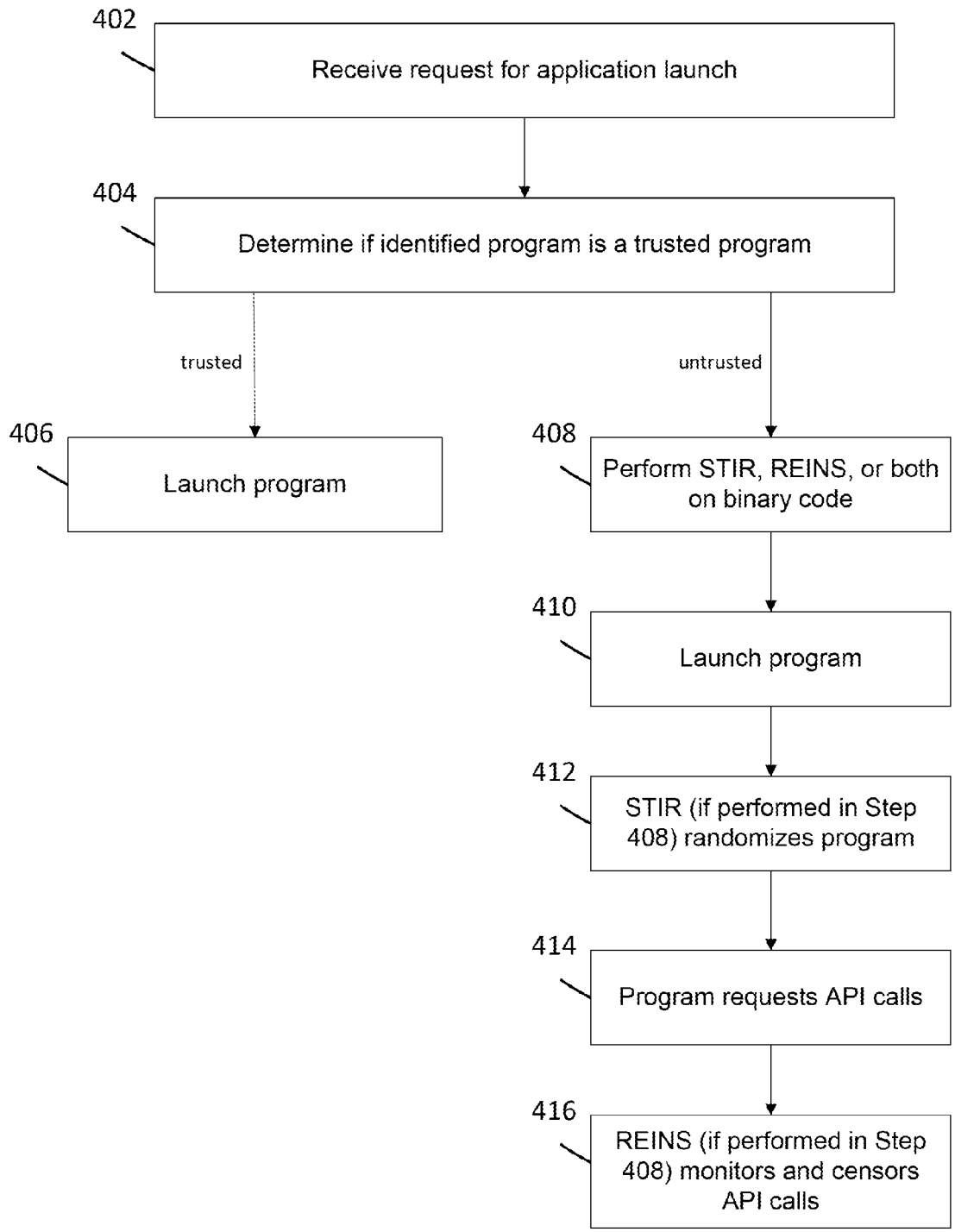
FIG. 4 is a flowchart illustrating steps performed in accordance with some embodiments of the present disclosure.

Turning to FIG. 4, process 400 is now described with specific reference to components of engine 302. FIG. 4 is a process 400 diagram illustrating steps performed in accordance with embodiments of the present disclosure.

As discussed above, the present disclosure generally provides systems and methods for adaptive malware detection and defenses. The disclosed systems and methods utilize code mutation technology learned from reactively adaptive malware for defensive purposes, thereby transforming potentially dangerous programs into safe programs. Such code mutations may be, at least in part, identified and/or learned utilizing known or to be known machine learning algorithms. As discussed herein, the disclosed systems and methods involve binary transformation of untrusted code. This enables preemptive modifications of untrusted programs before they execute thereby preventing them from violating system and/or user specified safety policies. As discussed herein, the safety policies should be understood by those of skill in the art to be along the lines of known or to be known protection schemes, in that such policies are set at limits (by a user, system, computing device, and/or any combination thereof) to protect the integrity of a computer system or network, and privacy of the data housed within and communicated to and from the computer system. As provided below respective Process 400, the code transformations implemented through the disclosed systems and methods are designed so that non-malicious code suffers no negative effects, as such code's "safe" behaviors are preserved; however, malicious (e.g., concealed) programming is rendered inoperable.

Software is often released in binary form via numerous distribution channels, such as, but not limited to, downloading over a network from a vendor's site, sharing through a content-distribution network, or sending via personal communications, and the like. All of these communications can introduce malicious code to a computer's system. Thus, it is common for end-users to possess known but not fully trusted binary code, or even unknown binaries. Therefore, upon execution of such programs, the present disclosure applies Process 400, as discussed below.

Process 400 begins with Step 402, upon a computing device (or system) receiving a request (ether from a user or the system) to launch an application. In some embodiments, this request may be in the form of a content request. In some embodiments, the binary code located on a device that is associated with the requested application (or program) is identified. Step 402 is handled by the Application module 304. After identification of the program from Step 402, a determination is made regarding whether the program (or content) to be launched is trusted, Step 404. That is, the requested program is analyzed and a determination is made regarding whether the binary code associated with the program is trusted. In some embodiments, Step 404 can be handled by the Trust module 306.

Step 404 involves determining if the program handling an event is performed by trusted software. In some embodiments, software (e.g., application or code of an application/program) may be deemed "trusted" if it is handled only by a subset of Operating System (OS) supplied software. Thus, the software may be deemed not trusted if other software or applications, not native the OS are involved in launching the application. Such non-native software may include software located remote to the client device, in the cloud, and/or subsequently installed after installation of the OS. In some embodiments, software may be deemed trusted upon a previous usage of the program without any malicious activity. Such previous usage may be a result of the application of the retrofitting algorithm, as discussed below. According to some embodiments, the determination of whether a program is trusted may be based on determinations local to the system, remote to a network server, or a combination of both, including accountings of determinations made by other systems on the network (including other user devices and/or servers servicing the instant device/network).

According to some embodiments, the determination of whether the program is trusted is performed by the Trust module 306 implementing the REINS module 308 and/or STIR module 310. That is, in accordance with some embodiments of the present disclosure, the determining Step 404 is effectuated by the REINS system application and/or STIR system application, as discussed in more detail below. Thus, a program will be determined trusted upon performance of Step 408, as discussed in more detail below, in addition to the discussion related to FIGS. 5-6.

According to some embodiments, Step 404 may not performed, as it may be inferred, due to the interconnectivity of most devices on a network and activity of users on a network, that all programs are untrusted to some degree. Therefore, as discussed in more detail below, some embodiments may include only performing Steps 408-416 upon receiving the application request from Step 402. However, embodiments also exist where the determination in Step 404 is performed thereby leading to either Step 406 or Steps 408-416.

According to some embodiments, upon a determination that the requested program is trusted, from Step 404, Process 400 proceeds to Step 406. In Step 406, the application program is launched. That is, if the program is trusted, neither REINS nor STIR are applied. Trusted applications are trusted not to contain any malicious or vulnerable functionality; therefore, such applications require no additional protection and are executed "as-is".

As discussed above, embodiments exist where all programs, even previously identified "trusted" programs may be treated as untrusted. Therefore, in such situations, in addition to situations where programs are explicitly deemed "untrusted", Process 400 proceeds from Step 404 directly to Step 408. In Step 408, the REINS system, the STIR system or both, are applied on the identified program's binary code. This application of the REINS and/or STIR system will be discussed in more detail below in relation to FIGS. 5-6. According to some embodiments, Step 408 is performed by the REINS module 308 and/or STIR module 310. In Step 410, the program is launched; and in Step 412 the STIR system, if performed in Step 408, is applied to program. That is, the new STIR programming that Step 408 (optionally) added to the untrusted program begins executing when the program is launched. This new programming randomizes the program layout before the rest of the program runs, as discussed in more detail below.

In Step 414, after the process of Steps 408-412, the program requests API calls. As understood by those of skill in the art, an API call is a service request submitted by an already running program to another computer program or module, such as an Operating System. API calls are exhibited by programs that have already launched. Therefore, Step 414 occurs after the program launch in Step 410. In Step 416, REINS (if performed in Step 408) monitors and censors the API calls. That is, the new REINS programming that Step 408 (optionally) added to the untrusted program executes every time the untrusted program requests a policy-relevant API call. This new programming examines an impending API call and suppresses it, or takes some other corrective action if the call would violate the safety policy, as discussed in more detail below.

Thus, as discussed in detail with reference to FIGS. 5-6, the systems and methods discussed herein disclose a retrofitting algorithm that involves applying software rewriting (e.g., REINS) and/or randomization (STIR) algorithms. It should be understood that the ordering of applying REINS and STIR need not be in the order illustrated in FIG. 4. That is, embodiments exist where applications of REINS and STIR may occur in reverse order, simultaneously (or in near-real time) upon calling the program (and/or upon an API call), during the execution of the program, during launch of the program, and/or any combination thereof. Indeed, in some embodiments, STIR may occur before or during application of REINS.

According to some embodiments, a fundamental basis underlying the retrofitting algorithm is REINS' and STIR's strategy for adding extra security programming to commodity binary software products (or commercial off-the-shelf software (COTS)). However, the present disclosure enables the adding of extra security without any cooperation from the producer of the products. That is, the retrofitting algorithm, and each of the steps including in such process or system is independently machine-verifiable. This strategy employed via the disclosed systems and methods is leveraged to retrofit such software with a variety of different forms of security. The application of REINS and STIR enable two different, but compatible forms of security to be employed within the retrofitting algorithm.

According to some embodiments, discussed below in more detail, REINS retrofits commodity software with new programming that provably enforces a custom security policy. The custom security policy can be any "safety policy." Such safety policy can be, for example, a description of some set of "bad" actions that the program must never exhibit. For example, a safety policy could state, "This program must never create any file whose name ends in '.exe'." Such a policy would block viruses, malware and reactively adaptive malware (e.g., Frankenstein virus) which tend to propagate by writing malicious, executable files (whose names, for example, usually end in ".exe" on Windows) to the disk. In order to enforce the custom security policy, REINS implements two technologies called Software Fault Isolation (SFI) and In-lined Reference Monitors (IRMs), which together ensure that each execution path in the retrofitted program has been augmented with the security checks necessary to block the bad actions. It should be understood that the technologies instituted by REINS is not limited to SFI and IRM, as all other known and to be known technologies and/or algorithms related to retrofitting program code are applicable within the REINS system.

According to some embodiments, discussed below in more detail, STIR gives commodity software the ability to re-randomize its internal layout every time it loads. According to some embodiments, the re-randomization implemented by STIR makes the software more secure against a large class of attacks that only work when attackers can predict the internal layout of victim programs. Many software attacks, most notably ROP attacks, fall into this category. As such, STIR retrofits commodity software to be much more resilient against those attacks.

According to some embodiments, the REINS and STIR systems work as a single product as a retrofitting algorithm within the presently disclosed systems and methods. While their implementation may not occur at the same time, each system (e.g., implementation of modules 308 and 310) is implemented with the disclosed systems and methods as a single process. According to some embodiments, this enables a combined single product that adds new security programming to binary software that performs 1) retrofitting of software and 2) re-randomization of the software each time it loads. Indeed, as discussed in more detail below, neither STIR nor REINS performs virus detection. Therefore, the disclosed systems and methods, through applications of REINS and STIR, perform malicious behavior detection that typically evades conventional virus detection by "hardening" binary software against all classes of attacks, as discussed above.

According to the present disclosure, for clarity and illustration purposes only, the systems and methods discussed herein are disclosed with reference to the Windows® Operating System by Microsoft®; however, it should be understood that equivalent components of all other known and to be known operating systems are applicable herein, and may be utilized as the platform for implementing the disclosed systems and methods.

Rewriting and In-Lining System (REINS)

Figure 5:
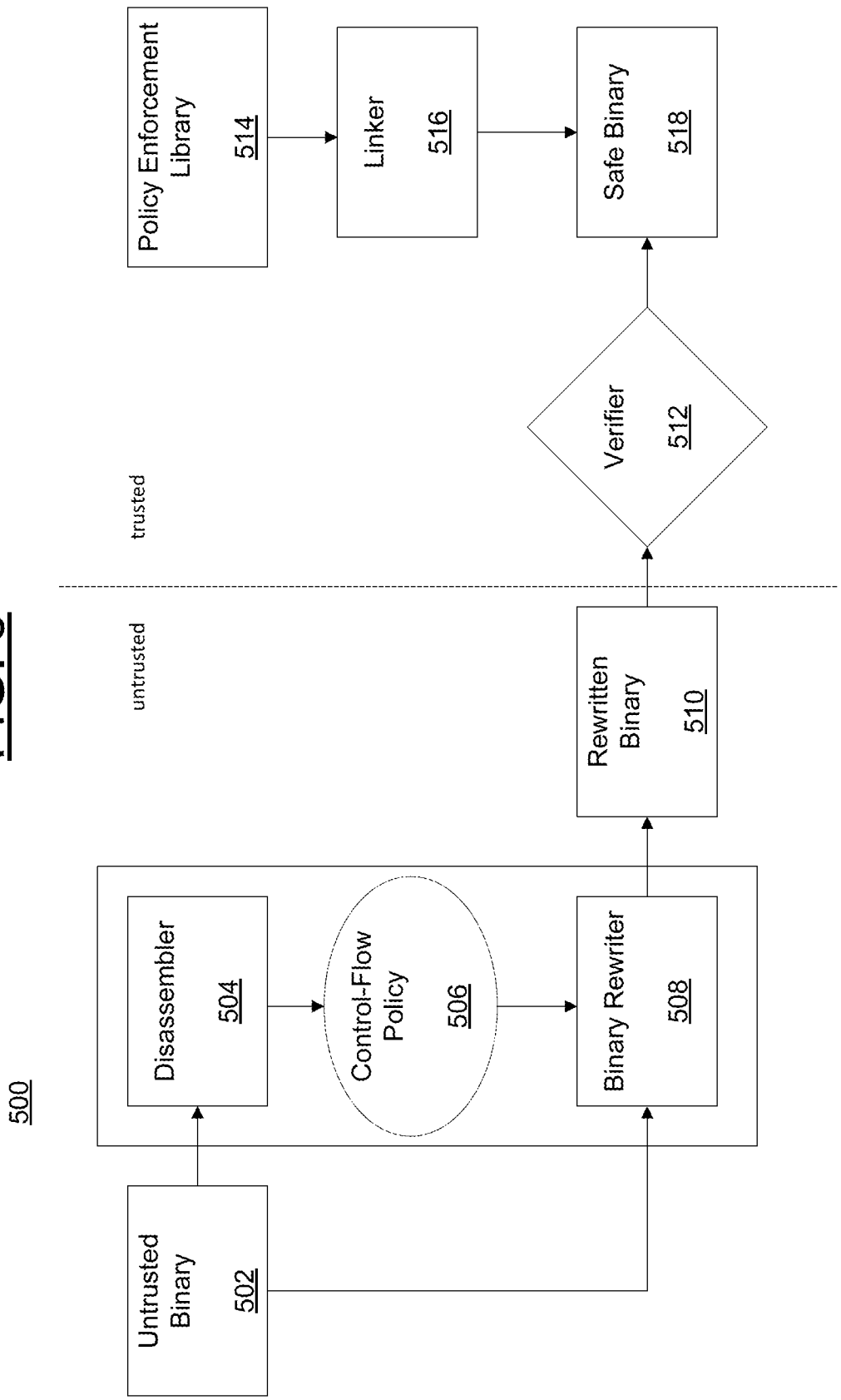
FIG. 5 is a schematic block diagram illustrating steps and components of a system in accordance with embodiments of the present disclosure.

As illustrated in FIG. 5, system 500 is a block diagram detailing the REINS system according to embodiments of the present disclosure. System 500 illustrates an embodiment of the retrofitting algorithm in accordance with the disclosed systems and methods. In connection with process 400 discussed above, system 500, implementing REINS, is a complex instruction set computing (CISC) native code rewriting and in-lining system that requires no cooperation from code-producers. Indeed, REINS is compiler agnostic. In some embodiments REINS is a static system, and in some embodiments, the system is dynamic. REINS algorithms have the ability to automatically rewrite large-scale applications yielded by arbitrary compilers. Such rewriting is able to be performed without access to source-level information (e.g., program database files (PDB) or debug symbol stores). REINS transparently supports a large category of production level applications, including, but not limited to, event-driven OS-callbacks, dynamic linking, exceptions, multi-threading, computed jumps, mixtures of trusted and untrusted modules, and the like. As discussed herein, REINS automatically transforms binaries to redirect system API calls through a trusted policy-enforcement library. The library mediates all security-relevant API calls and arguments before (and/or after) they are serviced, and uses this information to enforce safety polices over histories of these security-relevant events.

According to some embodiments, indirect control flow transfers (e.g., call/jmp/ret) are protected by in-lined guard code that ensures that they target safe code addresses when executed. In addition, a small, trusted verifier shifts the significant complexity of the rewriting system out of the trusted computing base (TCB) by independently certifying that rewritten binaries cannot circumvent the in-lined monitor. Thus, binaries that pass verification are guaranteed to be safe to execute. While reflective code can change its behavior in response to rewriting, verification ensures that such changes cannot impact policy-violations.

Thus, as discussed herein in relation to FIG. 5, REINS is the first compiler-agnostic, machine-certifying rewriting algorithm that supports real-world COTS binaries without any appeal to source code or debug symbols. As discussed above, REINS is also applicable to other operating systems and the reference to Windows® OS features/components is solely for illustrative purposes and should not be construed as limiting. REINS implements a designed set of novel techniques to support binary families for which fully correct automated disassembly is provably undecidable, including those that contain computed jumps, dynamic linking, static data interleaved with code, and untrusted callback functions invoked by the OS.

Therefore, based on the above discussion, system 500 illustrates system architecture for an embodiment of the retrofitting algorithm employed within the disclosed systems and methods. Specifically, untrusted binaries 502 are first analyzed and transformed into safe binaries by a binary rewriter 508. The binary rewriter 508 enforces a disassembler 504 to analyze (or parse) the binary and a control-flow policy/safety 506 that mediates all API calls. In some embodiments, the disassembler 504 can heuristically identify sets of jump targets in binary code. In some embodiments, the disassembler 504 generates a conservative disassembly of the untrusted binary code; this disassembly identifies all safe, non-branching flows (those reachable or non-reachable). As discussed above, the control flow policy 506 utilizes SFI to constrain control-flows of untrusted code.

According to some embodiments, control flow policy 506 also employs a lookup table, as discussed herein. According to some embodiments, system 500 implements code lookups with just two non-branching instructions (e.g., a compare instruction and a conditional move). This implementation is achieved by tagging each lookup table entry with a lead byte that never appears as the first byte of valid code. For example, a tag byte of 0xF4 encodes an x86 hlt instruction that is illegal in protected mode. Here, the compare instruction uses this byte to quickly distinguish stale pointers that point to the lookup table from those that already point to code. The conditional move then corrects the stale pointers. This leads to a low overhead as the system 500 enables a succinct realization of semantics-preserving computed jump guards. Therefore, the data of the code can then be read by the rewritten executable at its original addresses. Retaining the old code section as a data section has the additional advantage of retaining any static data that may be interleaved in the code. This data, therefore, can be read by the rewritten executable at its original addresses, thereby avoiding many difficult data preservation issues impacting current SFI systems. Dynamic data sizes, as produced herein in some embodiments, eclipse static code sizes in memory-intensive processes. Thus, rewritten processes sizes incur only a fraction of the size increase experienced by the disk images when they were loaded.

By way of a non-limiting example, below is a table illustrating the rewriting of original code for a program. The example involves an x86 code transformation; however, it should be understood that the below table for illustration purposes only, and should not be construed to be limiting in the application of the rewriting, the environment for implementing the disclosed systems and methods, nor the details of the steps being shown:

| Description | Original code | Rewritten code |
| --- | --- | --- |
| Computed jumps with register operands | call/jmp r | cmp byte ptr [r], 0xF4<br>cmovz r, [r+1]<br>and r, (d − c)<br>call/jmp r |
| Computed jumps with memory operands | call/jmp [m] | mov eax, [m]<br>cmp byte ptr [eax], 0xF4<br>cmovz eax, [eax+1]<br>and eax, (d − c)<br>call/jmp eax |
| Returns | ret (n) | and [esp], (d − c)<br>ret (n) |
| IAT loads<br>Tail-calls to high memory | mov rm, [IAT: n]<br>jmp [IAT: n] | mov rm, offset tramp_n<br>tramp_n:<br>   and [esp], (d − c)<br>   jmp [IAT: n] |

In some embodiments, utilizing the above example for illustration purposes for an example operating environment, the rewritten code can employ guarded instructions (e.g., row 3 of the above table). These guarded instructions, for example, can mask the return address atop the stack to a low memory chunk boundary. That is, during Step 408 discussed above, REINS partitions the binary's virtual memory at a selected virtual memory address 'd'. Therefore, virtual addresses below this partitioned point (i.e., those from 0 to d−1 inclusive) are referred to as "low memory"; whereas virtual addresses 'd' and above (inclusive) are referred to as "high-memory". Additionally, during Step 408, REINS selects an integer chunk size 'c'. Therefore, a "chunk" as referenced herein is any contiguous sequence of low memory addresses that range from a multiple of 'c' up to but not including the next multiple of 'c'. Call instructions can be moved to ends of chunks so that the return addresses they push onto the stack are aligned to the start of the following memory chunk. Thus, in some embodiments, the return guards have no effect upon return addresses pushed by properly rewritten call instructions, but they block jumps to corrupted return addresses that point to illegal destinations (or other policy violating activity), such as the stack. Thus, this makes all attacker-injected code unreachable.

Thus, system 500 then implements a separate verifier 512 certifies that the rewritten binaries 510 are policy-adherent. That is, the verifier 512 after receiving the rewritten binary 510, enables binary 510 to be analyzed by a policy enforcement library 514 and linker 516 (which enables uniformity between the original and rewritten code, as discussed above), thereby producing safe binary 518. Malicious binaries that defeat the rewriter's analysis might result in rewritten binaries that fail verification or that fail to execute properly, but never in policy violations.

In addition to the above discussion, according to some embodiments, the verifier 512 certifies that rewritten programs cannot circumvent the import address table (IAT) and therefore are policy-adherent. The verifier 512, in some embodiments, does not prove that the rewriting process is behavior preserving; this reduced obligation simplifies the verifier relative to the rewriter 508, resulting in a small trusted computing base (TCB). The verifier 512 performs, according to some embodiments, a fall-through disassembly of each executable section in the untrusted binary and checks the following (or at least a portion of the following) purely syntactic properties:

A) all executable sections reside in low memory;
B) all exported symbols (including the program entry-point) target low memory chunk boundaries;
C) no disassembled instruction spans a chunk boundary;
D) static branches target low memory chunk boundaries;
E) all computed jump instructions that do not reference IAT are immediately preceded by the appropriate 'and-masking' instruction in the same chunk (see for example the above table);
F) computed jumps that read the IAT access a properly aligned IAT entry, and are preceded by an 'and-mask' of the return address (in some embodiments, call instructions must 'end' on a chunk boundary rather than requiring a mask, since they push their own return addresses); and/or
G) there are no trap instructions (e.g., 'int' or 'syscall').

The above properties ensure that any unaligned instruction sequences concealed within untrusted, executable sections are not reachable at runtime. This allows the verifier 512 to limit its attention to a fall-through disassembly of executable sections, avoiding any reliance upon the incomplete code-discovery heuristics needed to produce full disassemblies of arbitrary (non-chunk-aligned) binaries.

Therefore, as an overview, system 500 illustrates how untrusted binary code 502 goes into a rewriter 504-508, resulting in a rewritten (i.e., retrofitted) binary 510 that cannot exhibit policy-violating actions. The right-hand side of FIG. 5 (or "trusted" side) shows how safety of the retrofitted binary can then be formally verified by a separate verifier 512. In some embodiments, the "trusted" side of system 500 facilitates a business model in which the rewriting is outsourced to an untrusted third party, whose results are independently verified by the code-consumer, 514-518, thereby ensuring the binary is safe 518.

Self-Transforming Instruction Relocation (STIR)

As illustrated in FIG. 6, system 600 is a block diagram detailing the STIR system. In general, system 600 re-randomizes the internal layout of commodity software every time it loads. According to some embodiments, the re-randomization implemented by STIR makes the software more secure against a large class of attacks that only work when attackers can predict the internal layout of victim programs. Many software attacks, most notably ROP attacks, fall into this category. As such, STIR retrofits commodity software to be much more resilient against those attacks.

System 600, via STIR, effectuates binary stirring by imbuing native code of software with the ability to self-randomize its instruction addresses each time it is launched. That is, the STIR system protects binary native code applications from ROP attacks by imbuing them with the power to randomize their own basic block layouts each time they are loaded. The randomization (e.g., re-randomizing or self-randomizing) can occur statically or dynamically, depending upon embodiments of the present disclosure. By frequently re-randomizing all such locations, ROP attacks are stymied by the transformation without the need for a precise and/or comprehensive policy that identifies all exploitable software vulnerabilities. The capacity to re-randomize code (i.e., code without debug symbols or relocation information) at load-time greatly eases deployment, and the code transformation (i.e., static or dynamic) yields significantly reduced performance overheads. Moreover, randomizing at basic block granularity achieves higher entropy than conventional applications which are typically susceptible to de-randomization attacks. That is, STIR (and in some embodiments, additional application of REINS) are not susceptible to de-randomization attacks, as the randomization of the legacy code of a program/software is an improvement, inter alia, to simply randomizing base addresses.

STIR is an automatic, binary-centric algorithm that does not require any source code or symbolic information for the target binary program. STIR enabled code randomly reorders the basic blocks in each binary code section each time it is launched. This increases attempts and frustrations of attempts of predicting locations of gadgets (e.g., fundamental units for computing within a respective computing environment). STIR is fully transparent, and does not modify the OS or associated compiler corresponding to the OS or associated program. Therefore, the present disclosure is easily deployable, as software vendors and/or end users need only apply STIR (i.e., the retrofitting algorithm) to their binaries to generate a self-randomizing copy, and can thereafter distribute the binary code normally. As discussed above, STIR is also applicable to other operating systems and the reference to Windows® OS features/components is solely for illustrative purposes and should not be construed as limiting.

Therefore, based on the above discussion, system 600 illustrates system architecture for an embodiment of the retrofitting algorithm employed within the disclosed systems and methods. It should be understood that according to some embodiments, system 600 acts in concert with system 500, as discussed above in relation to FIG. 4. System 600 receives commodity binaries, or original application binary 602. For example, binary 602 can be x86 COTS binaries. In another example, binary 602 can be PE files for Windows®, or ELF files for Linux®. The binaries 602 are then communicated to a rewriter 604. The rewriter 604 includes a disassembler 604a and a lookup table generator 604b. Thus, the rewriter 604 disassembles the target code of the binary 602 via the disassembler 604a, and then stirs the code via the lookup table generator 604b.

Specifically, binaries 602 are first disassembled to assembly code by the disassembler 604a. In some embodiments, the disassembler 604a can implement any known or to be known disassembler capable of accurately identifying likely computed jump targets. The present disclosure utilizes settings that encourage the disassembler to interpret all bytes that constitute valid instruction encodings as code, and that identify all instructions that implement prologues for known calling conventions as possible computed jump targets. These settings suffice to avoid all harmful disassembly errors. The assembly code is next partitioned into basic blocks, where a basic block can be any contiguous sequence of blocks. These blocks can comprise a sequence of instructions with a single entry point for loading the code. Each block must also end with an unconditional jump, but, according to some embodiments, STIR can meet this requirement by inserting jmp 0 instructions (a semantic no-op) to partition the code into arbitrarily small blocks during rewriting. The resulting blocks are copied and translated into a new binary section. The copying and translation can occur via a script, subroutine or program, for example, but not limited to, IDAPython. Here, system 600 implements two algorithms. The first algorithm (referred to as Algorithm 1 below, for example) translates a single instruction into its replacement in the new code section. According to embodiments, most instructions are left unchanged, but computed jumps are replaced with lookup table code and direct branches are repointed according to address mapping, as discussed above. The second algorithm (referred to as Algorithm 2 below, for example) calls the first algorithm as a subroutine to translate all the instructions. The second algorithm's, which translates all instructions, initial pass first computes mapping by using an identity function as the address mapping. In some embodiments, some instructions lengths may change as Algorithm 1 is applied. The disclosed systems and methods employed rewriter 604 conservatively translates these to their longest encodings during the first pass to avoid such changes. In some embodiments, the rewriter 604 may use multiple passes to generate smaller code. The second algorithm's second pass uses the resulting mapping to generate the final new code section with direct branches re-targeted.

By way of a non-limiting example, in order to clarify the steps being performed by the first and second algorithms discussed above, below is an example, non-limiting and non-system specific embodiment of sample algorithms that may be employed to effectuate binary stirring, as discussed herein:

---

Algorithm 1 Trans($\alpha$, c); Translate one instruction

---

Input: address mapping $\alpha : \mathbb{Z} \dashrightarrow \mathbb{Z}$ and instruction c
Output: translated instruction(s)
   if IsComputedJump(c) then
      op ← Operand(c)
      if IsRegister(op) then
         return [ cmp op, F4h;
                cmovz op, [op+1]; c ]
      else if IsMemory(op) then
         Operand(c) ← eax
         return [ mov eax, op;
                cmp [eax], F4h;
                cmovz eax, [eax+1]; c ]
      end if
   else if IsDirectJump(c) then
      t ← OffsetOperand(c)
      return c with operand changed to $\alpha(t)$
   else
      return c
   end if

---

Algorithm 2 Translate all instructions

---

Input: instruction list C
Output: rewritten block list B
   B ← [ ]
   $\alpha$ ← ∅
   t ← base address of .told section
   t' ← base address of .tnew section
   for all c ∈ C do
      if IsCode(c) then
         $\alpha$ ← $\alpha$ ∪ {(t, t')}

---

-continued

---

Algorithm 2 Translate all instructions

--- t' ← t' + |Trans(i, c)|
      end if
      t ← t + |c|
   end for
   for all c ∈ C do
      if IsCode(c) then
         append Trans($\alpha$, c) to B
      end if
   end for
   return B

---

Therefore, once the new code has been generated, the lookup table generator 604b overwrites all potential computed jump targets in the original code section with a tag byte followed by a pointer. Therefore, according to some embodiments, a stirred binary 606 is the result which can exchange pointers, and/or stale pointers at run time.

Thus, system 600 transforms and reassembles the code into new, self-randomizing binary that reorders its own basic blocks each time it is executed. This is achieved via the stirred binary 606 being run through (or communicated) the memory image 608, which includes a reassembler 608a and randomized instruction addresses 608b. In some embodiments, the reassembler 608a can implement any known or to be known reassembler capable of accurately identifying likely computed jump targets to compute a stirred binary of a program. The randomized instruction addresses 608a are utilized within the load-time stirring phase according to paths (e.g., code locations, pointers and the like) generated by the lookup table generator 604b used to generate the stirred binary 606.

According to some embodiments, when the rewritten program is launched, the STIR library's initializer code runs to completion before any code in STIR-enabled modules that link to it. For example, on Windows® this is achieved by the system load order, which guarantees that statically linked libraries initialize before modules that link to them. In another example, on Linux®, the library is implemented as a shared object (SO) that is injected into the address space of STIR-enabled processes using a preload environment variable. When this variable is set to the path of a shared object, the system loader ensures that the shared object is loaded first, before any of the other libraries that a binary may need. According to some embodiments, the library initializer performs two main tasks at program start: 1) All basic blocks in the linking module section of the binary are randomly reordered. During this stirring, direct branch operands are repointed according to address mapping. In some embodiments, this is computed during the static phase, e.g., the rewriter 604. In some embodiments, this may occur during the load-time stirring phase, e.g., memory image 608. Another task: 2) The lookup table in the linking module section is updated to point to the new basic block locations.

Once the initialization is complete, the linking section of the basic blocks is assigned the same access permissions as the original program's associated section. This preserves non-writability of code employing protections. According to some embodiments, to further minimize the attack surface, the library is designed to have as few return instructions as possible. The majority of the library that implements stirring is loaded dynamically into the address space at library initialization and then unloaded before the stirred binary runs. Thus, it is completely unavailable to attackers. The remainder of the library that stays resident performs small bookkeeping operations, such as, but not limited to, callback support.

Therefore, the retrofitting algorithm produces the effects of a combinational application of REINS and STIR (application of systems 500 and 600 upon an API call). According to some embodiments, the retrofitting algorithm which implements the REINS and STIR systems (500 and 600, respectively) provides a defense to stealth, known and to be known, malicious technologies. That is, the present disclosure's systems and methods provide automated, preemptive and binary transformations that modify potentially dangerous byte sequences in untrusted programs before they run, thereby precluding malicious software behavior.

The disclosed randomization (realized by STIR) and SFI/IRMs (realized by REINS) are general strategies for malware defense. The present disclosure's novel features include, inter alia, implementing these two techniques in concert and without requiring cooperation from the producer of the original software (e.g., independently machine-verifiable). For example, conventional defense techniques rely on the code-producer releasing the source code, and implementing a special compiler to realize any semblance of retrofitting. However, the presently disclosed systems and methods do not require the source code and/or usage of a compiler to provide the disclosed retrofitting algorithm. That is, as discussed above, the present disclosure does not require any cooperation from the developer; therefore, the disclosed systems and methods are applicable to any software product.

As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   (a) receiving, at a computing device, a request to launch a program;
   (b) identifying, via the computing device, binary code associated with the requested program;
   (c) rewriting, via the computing device, the binary code, (i) said rewriting comprising disassembling the binary code to identify a set of known targets within the code, (ii) said rewriting further comprising applying a policy to the binary code to restrict actions of the code upon execution of the program;
   (d) verifying, via the computing device, the rewritten binary code, said verification comprises certifying said rewritten binary is compliant with said policy;
   (e) launching, via the computing device, said program based upon said rewritten binary, said launching comprising execution of said program at a load-time; and
   (f) rearranging, via the computing device, the binary code of the program, (i) said rearranging occurring at said load-time, (ii) said rearranging comprising stirring the binary code by randomly organizing an internal layout of the binary code in response to said launching.

2. The method of claim 1, further comprising:
   receiving an API call, said API call generated by said launched program;
   determining that the API call corresponds to said policy; and
   based upon said API determination, examining the API call to ensure that the API call is policy adherent,
      wherein if said API call is policy adherent, allowing said API call to execute, and
      wherein if said API call violates said policy, performing a corrective action on said API call.

3. The method of claim 1, further comprising:
   (a) receiving a second request to launch said program, said second request occurring after an initial launch of said program, said initial launch resulting in the rearrangement of the binary code;
   (b) rewriting the rearranged binary code to produce second rewritten binary code, (i) said rewriting comprising disassembling the rearranged binary code to identify a set of known targets within the rearranged code, (ii) said rewriting further comprising applying a second policy to the rearranged binary code to restrict actions of the rearranged code upon second execution of the program;
   (c) verifying the second rewritten binary code, said verification comprises certifying said second rewritten binary is compliant with said second policy; and
   (d) launching said program based upon said second rewritten binary, said launching comprising execution of said program at a second load-time.

4. The method of claim 3, further comprising:
   rearranging the rearranged binary code to produce second rearranged binary code at said second load-time, said second rearranging comprising stirring the rearranged binary code by randomly organizing an internal layout of the rearranged binary code in response to execution of the second rewritten binary code.

5. The method of claim 1, wherein said rewriting and launching of said program is independently machine-verifiable, without a need for a compiler originally associated with said program.

6. The method of claim 1, further comprising:
   (a) determining that said binary code associated with the program is trusted, said determination based upon said rewriting of said binary code,
      wherein, upon said determination that said binary code is trusted, launching said program; and
   (b) determining that said binary code is untrusted, said determination based upon said rewriting of said binary code,
      wherein, upon said untrusted determination, launching said program only upon verification that said binary code is compliant with said policy.

7. The method of claim 1, wherein said policy comprises action restrictions associated with said program, wherein said program must act within bounds of said action restrictions.

8. The method of claim 7, further comprising halting launch of the trusted binary code upon a determination that an attempted launch violates said policy.

9. The method of claim 1, wherein said identifying the set of known targets within the code comprises identifying jump targets within said code and pointers associated with said code, wherein upon said rewriting and rearranging said binary code, said jump targets and said pointers are accounted for and utilized as a basis for said rewriting and rearranging.

29

10. The method of claim 1, wherein said (f) rearranging further comprises:
- (iii) disassembling said binary code to an assembly code level, said disassembly comprises interpreting all bytes of the binary code for known calling conventions;
- (iv) partitioning the assembly code into basic blocks, said basic blocks comprising a contiguous sequence of blocks each comprising instructions for loading the binary code;
- (v) generating new code based upon a comparison of said basic blocks and a lookup table, said lookup table associated with the binary code, said new code comprising said stirred binary code; and
- (vi) overwriting the binary code with the stirred binary code.

11. A non-transitory computer-readable storage medium tangibly encoded with computer-executable instructions, that when executed by a processor associated with a computing device, performs a method comprising:
- (a) receiving a request to launch a program;
- (b) identifying binary code associated with the requested program;
- (c) rewriting the binary code, (i) said rewriting comprising disassembling the binary code to identify a set of known targets within the code, (ii) said rewriting further comprising applying a policy to the binary code to restrict actions of the code upon execution of the program;
- (d) verifying the rewritten binary code, said verification comprises certifying said rewritten binary is compliant with said policy;
- (e) launching said program based upon said rewritten binary, said launching comprising execution of said program at a load-time; and
- (f) rearranging the binary code of the program, (i) said rearranging occurring at said load-time, (ii) said rearranging comprising stirring the binary code by randomly organizing an internal layout of the binary code in response to said launching.

12. The non-transitory computer-readable storage medium of claim 11, further comprising:
- (a) receiving a second request to launch said program, said second request occurring after an initial launch of said program, said initial launch resulting in the rearrangement of the binary code;
- (b) rewriting the rearranged binary code to produce second rewritten binary code, (i) said rewriting comprising disassembling the rearranged binary code to identify a set of known targets within the rearranged code, (ii) said rewriting further comprising applying a second policy to the rearranged binary code to restrict actions of the rearranged code upon second execution of the program;
- (c) verifying the second rewritten binary code, said verification comprises certifying said second rewritten binary is compliant with said second policy;
- (d) launching said program based upon said second rewritten binary, said launching comprising execution of said program at a second load-time; and
- (e) rearranging the rearranged binary code to produce second rearranged binary code at said second load-time, said second rearranging comprising stirring the rearranged binary code by randomly organizing an internal layout of the rearranged binary code in response to execution of the second rewritten binary code.

13. The non-transitory computer-readable storage medium of claim 11, further comprising:
receiving an API call, said API call generated by said launched program;

30 determining that the API call corresponds to said policy; and
based upon said API determination, examining the API call to ensure that the API call is policy adherent,
- wherein if said API call is policy adherent, allowing said API call to execute, and
- wherein if said API call violates said policy, performing a corrective action on said API call.

14. The non-transitory computer-readable storage medium of claim 11, further comprising:
- (a) determining that said binary code associated with the program is trusted, said determination based upon said rewriting of said binary code,
  wherein, upon said determination that said binary code is trusted, launching said program; and
- (b) determining that said binary code is untrusted, said determination based upon said rewriting of said binary code,
  wherein, upon said untrusted determination, launching said program only upon verification that said binary code is compliant with said policy.

15. The non-transitory computer-readable storage medium of claim 11, wherein said policy comprises action restrictions associated with said program, wherein said program must act within bounds of said action restrictions.

16. The non-transitory computer-readable storage medium of claim 15, further comprising halting launch of the trusted binary code upon a determination that an attempted launch violates said policy.

17. The non-transitory computer-readable storage medium of claim 11, wherein said (f) rearranging further comprises:
- (iii) disassembling said binary code to an assembly code level, said disassembly comprises interpreting all bytes of the binary code for known calling conventions;
- (iv) partitioning the assembly code into basic blocks, said basic blocks comprising a contiguous sequence of blocks each comprising instructions for loading the binary code;
- (v) generating new code based upon a comparison of said basic blocks and a lookup table, said lookup table associated with the binary code, said new code comprising said stirred binary code; and
- (v) overwriting the binary code with the stirred binary code.

18. A system comprising:
at least one computing device comprising:
memory storing computer-executable instructions; and
one or more processors for executing said computer-executable instructions, comprising:
- (a) receiving a request to launch a program;
- (b) identifying binary code associated with the requested program;
- (c) rewriting the binary code, (i) said rewriting comprising disassembling the binary code to identify a set of known targets within the code, (ii) said rewriting further comprising applying a policy to the binary code to restrict actions of the code upon execution of the program;
- (d) verifying the rewritten binary code, said verification comprises certifying said rewritten binary is compliant with said policy;
- (e) launching said program based upon said rewritten binary, said launching comprising execution of said program at a load-time; and
- (f) rearranging the binary code of the program, (i) said rearranging occurring at said load-time, (ii) said rearranging comprising stirring the binary code by randomly organizing an internal layout of the binary code in response to said launching.

19. The system of claim 18, further comprising:
  receiving an API call, said API call generated by said launched program;
  determining that the API call corresponds to said policy; and
  based upon said API determination, examining the API call to ensure that the API call is policy adherent,
    wherein if said API call is policy adherent, allowing said API call to execute, and
    wherein if said API call violates said policy, performing a corrective action on said API call.

20. The system of claim 18, further comprising:
  (a) determining that said binary code associated with the program is trusted, said determination based upon said rewriting of said binary code,
    wherein, upon said determination that said binary code is trusted, launching said program; and
  (b) determining that said binary code is untrusted, said determination based upon said rewriting of said binary code,
    (i) wherein, upon said untrusted determination, launching said program only upon verification that said binary code is compliant with said policy, (ii) wherein said policy comprises action restrictions associated with said program, wherein said program must act within bounds of said action restrictions.

* * * * *

UNITED STATES PATENT AND TRADEMARK OFFICE
CERTIFICATE OF CORRECTION

PATENT NO. : 9,202,044 B2
APPLICATION NO. : 14/086179
DATED : December 1, 2015
INVENTOR(S) : Kevin William Hamlen Page 1 of 1

It is certified that error appears in the above-identified patent and that said Letters Patent is hereby corrected as shown below:

In the specification

Column 1, Line 8, after "but otherwise reserves all copyright rights whatsoever."
insert
--GOVERNMENT INTEREST
This invention was made with government support under Grant Nos. FA9550-08-1-0044 and FA9550-10-1-0088, and Career Award No. 1054629 awarded by the U.S. Air Force Office of Scientific Research (AFOSR) and the National Science Foundation, respectively. The government has certain rights in the invention.--

Signed and Sealed this
Twelfth Day of April, 2016

Michelle K. Lee
*Director of the United States Patent and Trademark Office*